United States Patent
Huang et al.

(10) Patent No.: US 11,738,318 B2
(45) Date of Patent: Aug. 29, 2023

(54) EXTERNAL LOOP SLURRY REACTOR

(71) Applicants: QINGDAO INSTITUTE OF BIOENERGY AND BIOPROCESS TECHNOLOGY, CHINESE ACADEMY OF SCIENCES, Qingdao (CN); INSTITUTE OF PROCESS ENGINEERING, CHINESE ACADEMY OF SCIENCES, Beijing (CN)

(72) Inventors: Qingshan Huang, Qingdao (CN); Aqiang Chen, Qingdao (CN); Shujun Geng, Qingdao (CN); Hang Xiao, Qingdao (CN); Chao Yang, Beijing (CN)

(73) Assignees: QINGDAO INSTITUTE OF BIOENERGY AND BIOPROCESS TECHNOLOGY, CHINESE ACADEMY OF SCIENCES, Qingdao (CN); INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 16/976,442

(22) PCT Filed: Sep. 24, 2019

(86) PCT No.: PCT/CN2019/107424
§ 371 (c)(1),
(2) Date: Aug. 27, 2020

(87) PCT Pub. No.: WO2021/051426
PCT Pub. Date: Mar. 25, 2021

(65) Prior Publication Data
US 2023/0062956 A1      Mar. 2, 2023

(30) Foreign Application Priority Data

Sep. 19, 2019   (CN) .......................... 201910885635.7

(51) Int. Cl.
*B01J 8/22*       (2006.01)
*B01J 8/00*       (2006.01)
(Continued)

(52) U.S. Cl.
CPC ............. *B01J 8/228* (2013.01); *B01J 8/0055* (2013.01); *B01J 8/1836* (2013.01);
(Continued)

(58) Field of Classification Search
CPC ...................... B01J 8/228; B01J 8/0055; B01J 2208/00761; B01J 2208/00778; B01J 2208/00991
See application file for complete search history.

(56) References Cited

U.S. PATENT DOCUMENTS 7,241,393 B2 *  7/2007 Stoy ....................... C10G 2/342
                                                  209/733
8,389,585 B2 *  3/2013 Hammond ............ B01J 8/0055
                                                  518/700

FOREIGN PATENT DOCUMENTS

| CN | 102049222 A | 5/2011 |
| CN | 106334500 A | 1/2017 |
| CN | 207981116 U | 10/2018 |

* cited by examiner

*Primary Examiner* — Lessanework Seifu
(74) *Attorney, Agent, or Firm* — Weiss & Moy, PC; Jeffrey D. Moy

(57) ABSTRACT

The present invention discloses an external loop slurry reactor, comprising a gas-liquid integrated distributor, a riser, a degassing zone, a solid-liquid separation circulation unit, and a storage tank. When the reactor works, reactants are injected into the riser through the gas-liquid integrated distributor; the slurry mixes and flows upwards to the
(Continued)

degassing zone at the top for gas removal, and a large number of bubbles are removed. The slurry with catalyst particles then enters a downcomer and flows downwards. The slurry flows into a first-stage hydrocyclone and a multi-stage hydrocyclone in sequence for solid-liquid separation. The diameter of the first-stage hydrocyclone is larger than that of the multi-stage hydrocyclone. The separated solid particles flow back into the riser to continue to participate in the reaction.

12 Claims, 2 Drawing Sheets

(51) Int. Cl.
*B01J 8/18* (2006.01)
*B01J 19/24* (2006.01)
(52) U.S. Cl.
CPC .. *B01J 19/2435* (2013.01); *B01J 2208/00548* (2013.01); *B01J 2208/00761* (2013.01)

EXTERNAL LOOP SLURRY REACTOR

CROSS REFERENCE TO RELATED APPLICATION

This application claims the priority to International Application Number PCT/CN2019/107424, which claims priority to Chinese Patent Application No. 201910885635.7 entitled "EXTERNA; LOOP SLURRY REACTOR", filed with the Chinese Patent Office on Sep. 19, 2019, which is incorporated herein by reference in its entirety.

TECHNICAL FIELD

The present invention relates to the technical field of a slurry reactor and its peripheral supporting equipment, in particular to an external loop slurry reactor.

BACKGROUND

An external loop slurry reactor is a gas-liquid-solid three-phase reactor which has been commonly used in industries. It is a high-efficiency multiphase reactor developed on the basis of the bubble column. The external loop slurry reactor has not only all the advantages that the bubble column has but also the advantages that the bubble column does not have. Compared to the fixed bed reactor, the slurry reactor has a larger liquid storage capacity and correspondingly a higher production capacity; for a reaction process which would release a significant amount of reaction heat, such as the catalytic reaction process of Fischer-Tropsch synthesis, the external loop slurry reactor can effectively remove the reaction heat in time, and ensure the reactor working under the constant temperature, which is of great significance for safety production. In addition, the fluid in the slurry loop reactor can form a regular directional circulation flow, which enhances the mixing, diffusion, mass transfer, and heat transfer between the reactants.

In the catalytic reaction process, such as the methanol-to-olefin (MTO) process, catalysts with diameters of tens of microns or even finer are sometimes used. The size of the catalyst particles will become smaller due to abrasion, which is inevitable in the slurry reactors. As a result, separation of the catalyst particles from the reaction product (liquid) becomes a significant challenge. Because solid particles have a specific range of size distribution, the efficient complete liquid-solid separation at a low cost and the return of the solid particles to the slurry reactor for recycling have become the critical technology during the application of the slurry reactors, and those are also the technical problems that desired to be solved urgently at this stage. The separation of the liquid phase and the solid phase in conventional slurry reactors is generally carried out in equipment outside of the reactor. The slurry containing catalysts must be transported by slurry pumps, which are expensive and fragile. The separated catalysts still need to be sent back to the reactor in a slurry state. The performance of the continuous operation of this process is usually unsatisfactory. Moreover, the catalyst particles are easy to be broken in this process, which will bring about some problems during the long-term continuous operation of the reactor.

The Chinese invention patent with the authorized announcement number CN 102049222 B discloses an application method of a slurry loop reactor with a new type of filter unit. The filter unit is assembled inside the riser of the reactor. The slurry flows upward in the riser, and some of the slurries flow into the internal channel of the filter unit. The liquid free of particles passes through the wall of the filter pipe and is then discharged as the product from the slurry reactor through the discharge port; the concentrated slurry after filtration continues to flow upwards and enters the settling zone with an upper pipe of enlarged diameter. In the settling zone, most bubbles are removed, and the slurry enters the downcomer, through which the slurry circulates back to the riser to continue participating in the reaction.

The Chinese utility model patent with the authorized announcement number CN 207981116 U also discloses a slurry loop reactor. A solid-liquid separator is installed on the upper part of the downcomer for liquid-solid separation. Filter units are equipped in the solid-liquid separator, and a clean liquid outlet is connected to its upper part.

The filter units used in the published patents mentioned above are still filtered technology in nature. The essential problem of the filter technology, being easy to be blocked, still exists. As a result, the performance of the continuity production is unsatisfactory, and the production capacity is unstable, which may result in some safety problems.

The Chinese invention patent with the authorized announcement number CN 106334500A discloses an external loop reactor with reaction, heat exchange, and separation functions at the same time. A hydrocyclone is installed at the bottom of the downcomer of the external loop reactor. The liquid and solid phase could be separated under the swirl flow effect in the hydrocyclone without additional power. The clean liquid product can discharge from the overflow port, and the solid-concentrated slurry is returned to the main reactor through the lower downcomer to continue participating in the reaction. In addition, the excellent heat exchange performance of the external loop reactor is retained. However, since that invention uses only one hydrocyclone or several hydrocyclones connected in parallel for solid-liquid separation and circulation, solid particles with a smaller size, especially solid catalyst particles with a diameter of 1-30 microns, may escape from the overflow port with a great chance. Besides, the energy consumption of the hydrocyclone is quite high; its slurry phase processing capacity and clean liquid flow rate may be limited to a certain extent when the power supplied for solid-liquid separation is insufficient. Thus, the reactor needs to be improved urgently to meet the requirement of industrial production.

Therefore, how to change the current situation that the fine catalyst particles and the liquid reactant cannot be completely separated during the operation of the slurry reactor has become an urgent problem for those skilled in the art.

SUMMARY

The object of the present invention is to provide an external loop slurry reactor to solve the above technical problems in the prior art and realize the thorough separation of catalyst particles and liquid reactant, which could improve the production efficiency and safety performance, and decrease the production cost.

In order to achieve the above object, the present invention provides the following solutions. The present invention provides an external loop slurry reactor, which is made up of a gas-liquid integrated distributor, a riser, a degassing zone, a solid-liquid separation circulation unit, and a storage tank. The gas-liquid integrated distributor is installed under the degassing zone, and the two ends of the riser are connected to the gas-liquid integrated distributor and the degassing zone, respectively. The diameter of the degassing zone is larger than that of the riser. The solid-liquid separation circulation unit comprises a downcomer, a first-stage hydrocyclone, and multi-stage hydrocyclones. One end of the downcomer is connected to the inlet of the first-stage hydrocyclone. The other end of the downcomer is connected to the degassing zone when them is only one set of solid-liquid separation circulation units. When there is more than one set of solid-liquid separation circulation units, the solid-liquid separation circulation units are arranged in sequence along the axial direction of the riser; the other end of the downcomer at the top is connected to the degassing zone while the other end of the remaining downcomers is connected to the riser; the overflow port at the top of the first-stage hydrocyclone is connected to the inlet of the multi-stage hydrocyclone; the overflow port at the top of the multi-stage hydrocyclone is connected to the storage tank; the underflow ports at the bottom of the first-stage hydrocyclone and the multi-stage hydrocyclone are both connected to the riser; the diameter of the first-stage hydrocyclone is larger than that of the multi-stage hydrocyclone.

Preferably, heat exchangers are installed in or outside both the riser and the downcomer.

Preferably, circulating pumps are provided between the multi-stage hydrocyclones and the storage tank. Each solid-liquid separation circulation unit corresponds to one circulating pump, and the number of the circulating pumps is the same as that of the solid-liquid separation circulation units.

Preferably, the downcomer comprises an inclined section and a vertical section, and the two sections are connected. The vertical section is connected to the inlet of the first-stage hydrocyclone while the inclined section is connected to the degassing zone or the riser. The inclined section is assembled obliquely downward from the degassing zone or the riser toward the direction of the vertical section.

Preferably, the first-stage hydrocyclone and the multi-stage hydrocyclone are all connected to the riser through connecting pipelines, and the connecting pipeline is assembled obliquely downward from the first-stage hydrocyclone or the multi-stage hydrocyclone toward the direction of the riser.

Preferably, the degassing zone comprises a circular truncated cone section and a cylindrical section. The small-diameter end of the circular truncated cone section is connected to the riser, and the large-diameter end of the circular truncated cone section is connected to the cylindrical section.

Preferably, the multi-stage hydrocyclone comprises a certain number of hydrocyclone groups. When there is a plurality of hydrocyclone groups, the hydrocyclone groups are connected in series and the hydrocyclone diameter thereof is gradually reduced. Each hydrocyclone group comprises a plurality of hydrocyclones with the same diameter connected in parallel.

Compared with the prior art, the present invention has achieved the following technical effects. The external loop slurry reactor of the present invention comprises a gas-liquid integrated distributor, a riser, a degassing zone, a solid-liquid separation circulation unit, and a storage tank. The gas-liquid integrated distributor is installed under the degassing zone, and the two ends of the riser are connected to the gas-liquid integrated distributor and the degassing zone, respectively. The diameter of the degassing zone is larger than that of the riser. The solid-liquid separation circulation unit comprises a downcomer, a first-stage hydrocyclone, and multi-stage hydrocyclones. One end of the downcomer is connected to the inlet of the first-stage hydrocyclone. The other end of the downcomer is connected to the degassing zone when there is only one set of solid-liquid separation circulation units. When there is more than one set of solid-liquid separation circulation units, the solid-liquid separation circulation units are arranged in sequence along the axial direction of the riser; the other end of the downcomer at the top is connected to the degassing zone while the other end of the remaining downcomers is connected to the riser; the overflow port at the top of the first-stage hydrocyclone is connected to the inlet of the multi-stage hydrocyclone; the overflow port at the top of the multi-stage hydrocyclone is connected to the storage tank; the underflow ports at the bottom of the first-stage hydrocyclone and the multi-stage hydrocyclone are both connected to the riser; the diameter of the first-stage hydrocyclone is larger than that of the multi-stage hydrocyclone. When the external loop slurry reactor of the present invention works, reactants flow into the riser through the gas-liquid integrated distributor. The slurry then mixes and moves upwards to the degassing zone at the top for degassing, and a large number of bubbles are removed. The slurry with catalyst particles enters the downcomer and flows downwards. The slurry then enters the first-stage hydrocyclone and the multi-stage hydrocyclone in sequence for solid-liquid separation. The diameter of the first-stage hydrocyclone is larger than that of the multi-stage hydrocyclone. The separated solid particles flow back into the riser to continue participating in the reaction. The external loop slurry reactor can not only separate and circulate the solid particles above micron-level, but also realize the continuous production. Besides, the production efficiency and safety performance are improved, and the blockage problem in the present filtration technology are solved. Finally, the directional flow of the reactor itself provides the initial power for the solid-liquid separation circulation unit, reducing the production cost.

BRIEF DESCRIPTION OF THE DRAWINGS

In order to describe the embodiments and the technical solutions of the present invention more clearly, the drawings referred to in the embodiments will be briefly introduced hereinafter. Obviously, the drawings in the following description are only a part of the embodiments of the present invention. For those skilled in the art, other drawings may be obtained based on these drawings without paying any creative labor.

In the figures, 1 is a gas-liquid integrated distributor; 2 is a riser; 3 is a degassing zone; 301 is a circular truncated cone section; 302 is a cylindrical section; 4 is a solid-liquid separation circulation unit; 5 is a storage tank; 6 is a downcomer; 601 is an inclined section; 602 is a vertical section; 7 is a first-stage hydrocyclone; 8 is a multi-stage hydrocyclone; 9 is a circulating pump; 10 is a connecting pipeline.

DESCRIPTION OF THE EMBODIMENTS

The technical solutions in the embodiments of the present invention will hereinafter be described clearly and thoroughly by referring to the accompanying drawings of the embodiments of the present invention. Obviously, the described embodiments are only a part of the embodiments of the present invention, rather than all the embodiments. Based on the embodiments of the present invention, all other embodiments obtained by those skilled in the art without paying any creative labor shall fall within the protection scope of the present invention.

The object of the present invention is to provide an external loop slurry reactor to solve the above problems in the prior art. The external loop slurry reactor in the present invention could separate the catalyst particles from the liquid reactant completely, realize continuous production, improve production efficiency, and reduce the production cost.

In order to make the above objectives, features, and advantages of the present invention more evident and understandable, the present invention will be further described in detail hereinafter referring to the accompanying drawings and specific embodiments.

Figure 1:
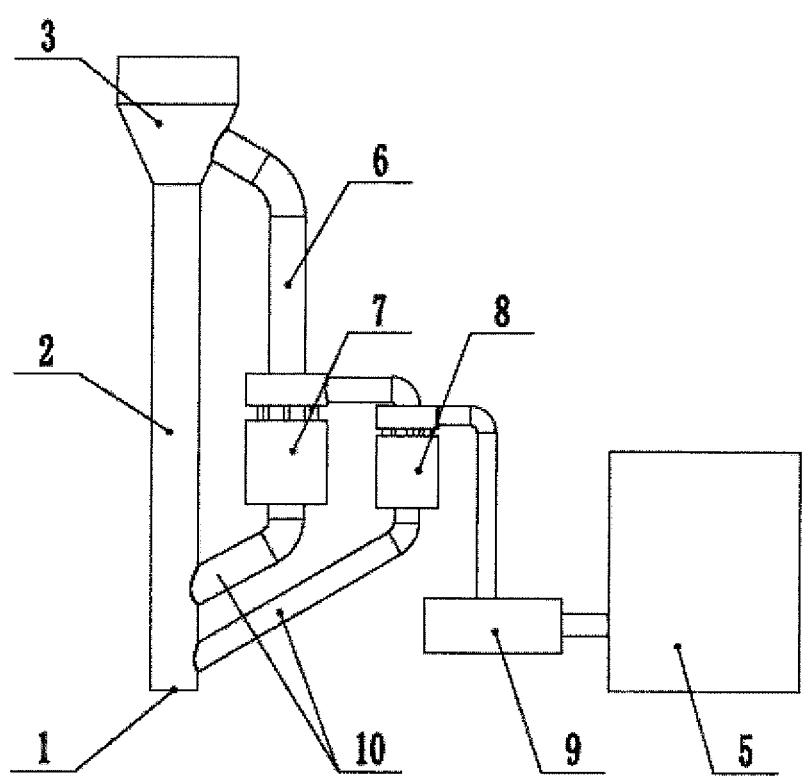
FIG. 1 is a schematic structural diagram of the external loop slurry reactor according to the present invention.
Figure 2:
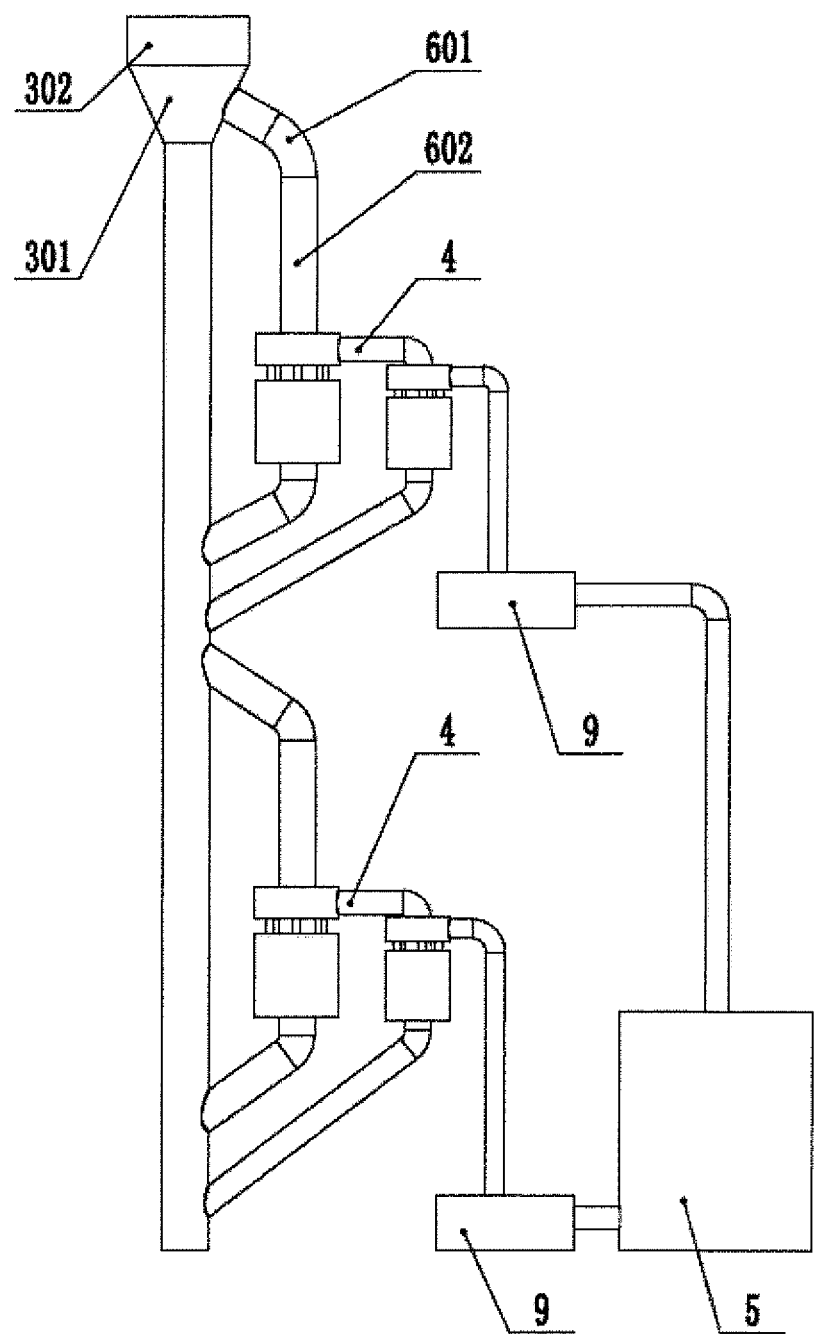
FIG. 2 is a schematic diagram of Embodiment 2 in the specific implementation.

Referring to FIG. 1 and FIG. 2, FIG. 1 is the schematic structural diagram of the external loop slurry reactor in the present invention, and FIG. 2 is the schematic diagram of Embodiment 2 in the specific implementation.

The present invention provides an external loop slurry reactor, comprising a gas-liquid integrated distributor 1, a riser 2, a degassing zone 3, a solid-liquid separation circulation unit 4, and a storage tank 5. The gas-liquid integrated distributor 1 is installed under the degassing zone 3, and the two ends of the riser 2 are connected to the gas-liquid integrated distributor 1 and the degassing zone 3, respectively. The diameter of the degassing zone 3 is larger than that of the riser 2. The solid-liquid separation circulation unit 4 comprises a downcomer 6, a first-stage hydrocyclone 7, and multi-stage hydrocyclones 8. One end of the downcomer 6 is connected to the inlet of the first-stage hydrocyclone 7. The other end of the downcomer 6 is connected to the degassing zone 3 when there is only one set of solid-liquid separation circulation unit 4. When there are more than one set of solid-liquid separation circulation units 4, the solid-liquid separation circulation units 4 are arranged in sequence along the axial direction of the riser 2; the other end of the downcomer 6 at the top is connected to the degassing zone 3 while the other end of the remaining downcomers 6 is connected to the riser 2; the overflow port at the top of the first-stage hydrocyclone 7 is connected to the inlet of the multi-stage hydrocyclone 8; the overflow port at the top of the multi-stage hydrocyclone 8 is connected to the storage tank 5; the underflow ports at the bottom of the first-stage hydrocyclone 7 and the multi-stage hydrocyclone 8 are both connected to the riser 2; the diameter of the first-stage hydrocyclone 7 is larger than that of the multi-stage hydrocyclone 8.

When the external loop slurry reactor of the present invention works, reactants flow into the riser 2 through the gas-liquid integrated distributor 1. The slurry then mixes and moves upwards to the degassing zone 3 at the top for degassing, and a large number of bubbles are removed. The slurry with catalyst particles enters the downcomer 6 and flows downwards. The slurry then enters the first-stage hydrocyclone 7 and the multi-stage hydrocyclone 8 in sequence for solid-liquid separation. The diameter of the first-stage hydrocyclone 7 is larger than that of the multi-stage hydrocyclone 8. The separated solid particles flow back into the riser 2 to continue participating in the reaction. The external loop slurry reactor can not only separate and circulate the solid particles above the micron-level, but also realize the continuous production. Besides, the production efficiency and safety performance are improved, and the blockage problem in the present filtration technology are solved. Moreover, the directional flow of the reactor itself provides the initial power for the solid-liquid separation circulation unit 4, and that reduces the production cost. In addition, it should be noted that the number of solid-liquid separation circulation units 4 should be determined depending on the height of the riser 2. The downcomer 6 of the topmost solid-liquid separation circulation unit 4 is connected to the degassing zone 3, and the downcomers 6 of the other solid-liquid separation circulation units 4 are all connected to the riser 2 to ensure that there is sufficient mass transfer in the downcomer 6 to ensure the normal production. In the practical production, the size of the riser 2, the downcomer 6, the first-stage hydrocyclone 7, and the multi-stage hydrocyclone 8 may vary, depending on the processing capacity.

Specifically, heat exchangers are installed in or outside of both the riser 2 and the downcomer 6. The heat exchangers are connected with the external cooling medium, and the flow rate of the cooling medium can be adjusted to meet the heat exchange requirements during the reaction process and to improve the production safety. In practical production, according to the heat exchange requirements in the reaction process, the heat exchanger can be assembled outside of the riser 2 and the downcomer 6, or inside the riser 2 and the downcomer 6. When the heat exchangers are installed in the riser 2 and the downcomer 6, they should not affect the slurry flow in the riser 2 and the downcomer 6. It should be noted that the heat exchanger here is a standard method used by those skilled in the art, and it will not be described in detail here.

More specifically, a circulating pump 9 is provided between the multi-stage hydrocyclone 8 and the storage tank 5; the circulating pump 9 provides flow power for the multi-stage hydrocyclone 8; each solid-liquid separation circulation unit 4 corresponds to one circulating pump 9, and the number of the circulating pumps 9 is the same as that of the solid-liquid separation circulation units 4.

The downcomer 6 comprises an inclined section 601 and a vertical section 602, and the two sections are connected. The vertical section 602 is connected to the inlet of the first-stage hydrocyclone 7, while the inclined section 601 is connected to the degassing zone 3 or the riser 2. The inclined section 601 is provided obliquely downward from the degassing zone 3 or the riser 2 toward the direction of the vertical section 602, and this kind of installation method could reduce the flow resistance of the reaction material.

In addition, the first-stage hydrocyclone 7 and the multi-stage hydrocyclone 8 are both connected to the riser 2 through a connecting pipeline 10. The connecting pipeline 10 is installed obliquely downward from the first-stage hydrocyclone 7 or the multi-stage hydrocyclone 8 toward the direction of the riser 2, so that the particles could smoothly flow back to the riser 2 to continue production.

In this specific embodiment, the degassing zone 3 comprises a circular truncated cone section 301 and a cylindrical section 302, and these two sections are connected. The small-diameter end of the circular truncated cone section 301 is connected to the riser 2, and the large-diameter end of the circular truncated cone section 301 is connected to the cylindrical section 302. The circular truncated cone section 301 makes the cylindrical section 302 and the riser 2 smoothly transitioned and connected. After the slurry flows into the degassing zone 3 where the cross-section of the flow channel is enlarged, the turbulence of the slurry are suppressed, and thus a large number of bubbles are removed.

Further, the multi-stage hydrocyclone 8 comprises a plurality of hydrocyclone groups. When there is a plurality of hydrocyclone groups, the hydrocyclone groups are connected in series and their diameter thereof decreases gradually, and the hydrocyclone group comprises a plurality of hydrocyclones with the same diameter connected in parallel. The first-stage hydrocyclone 7 can separate solid particles with a larger diameter. The solid particles with a smaller diameter are separated step by step by the multi-stage hydrocyclone 8, and the purpose of solid-liquid complete separation is finally realized. It should be explained here that the hydrocyclone is a standard method used by those skilled in the art, which will not be described in detail here.

Two specific embodiments are presented here to explain the present invention in more detail, and at the same time, different numbers of solid-liquid separation circulation units 4 will be illustrated with examples.

Embodiment 1

The total height of the reactor is 5 m. The diameter of the riser 2 is 1 m, and the diameter of the downcomer 6 is 0.5 m. The reaction material is injected into the riser 2 through the gas-liquid integrated distributor 1. The solids are catalyst particles with a particle size distribution range of 0.3-100 µm. The slurry mixes and flows upwards to the degassing zone 3 for degassing. After the slurry with catalyst particles is degassed, it then enters the downcomer 6 and flows downwards. A first-stage hydrocyclone 7 is provided at the bottom of the downcomer 6. The first-stage hydrocyclone 7 comprises four parallel-connected hydrocyclones with a diameter of 120 mm. The slurry enters the four hydrocyclones for solid-liquid separation from their individual inlets. The dense phase discharged from the bottom of the four first-stage hydrocyclone 7 and collected and returned to the riser 2 to continue participating in the reaction. The light phase discharged after confluence from the overflow port at the top of the four first-stage hydrocyclone 7. The discharged reaction materials then flow into the multi-stage hydrocyclone 8 for further separation. The multi-stage hydrocyclone 8 comprises two hydrocyclones with a diameter of 40 mm. The concentration of solid particles finally discharged from the overflow port at the top of the multi-stage hydrocyclone 8 is lower than 2 µg/ml; the maximum diameter of the solid particles is 0.75 µm; the separation efficiency is above 99.9%. The heavy phase components discharged from the bottom of the multi-stage hydrocyclone 8 all return to the riser 2 to continue participating in the reaction. The clean liquid product flowing out of the overflow port at the top of the multi-stage hydrocyclone 8 is collected in the storage tank 5.

Embodiment 2

The total height of the reactor is 15 m. The diameter of the riser 2 is 4 m, and the diameter of the downcomer 6 is 2 m. There are two downcomers 6 of 6 m in height in the axial direction. The reaction material is injected into the riser 2 through the gas-liquid integrated distributor 1. The solids are particles with a particle size distribution range of 0.5-300 µm. Some of the reaction material directly enters the downcomer 6 at the bottom for separating the solid from liquid, and other reaction materials continue to move upwards to the degassing zone 3 for degassing. The ratio of the diameter of the cylindrical section 302 of the degassing zone 3 to that of the riser 2 is 3:1, and the height of the degassing zone 3 is 1 m. In this specific embodiment, the first-stage hydrocyclone 7 comprises four parallel-connected hydrocyclones with a diameter of 160 mm. The slurry enters the first-stage hydrocyclone 7 for solid-liquid separation. The dense phase is discharged from the bottom of the first-stage hydrocyclone 7 and then returns to the riser 2. The light phase discharges from the overflow port at the top of the first-stage hydrocyclone 7. The maximum diameter of the solid particles discharged from the overflow port is 50 µm. The separated light phase enters the multi-stage hydrocyclone 8 for re-separation. The multi-stage hydrocyclone 8 is formed by connecting two groups of hydrocyclones of different sizes in series, and the two hydrocyclone groups have a diameter of 100 mm and 20 mm, respectively. Each hydrocyclone group comprises four hydrocyclones connected in parallel. The concentration of the solid particles finally discharged from the overflow port at the top of the multi-stage hydrocyclone 8 is less than 5 µg/ml; the maximum diameter of the particles is 0.96 µm, and the separation efficiency is above 99.99%. The dense phase components discharged from the bottom of the multi-stage hydrocyclone 8 all return to the riser 2. The clean liquid product flowing out of the overflow port at the top of the multi-stage hydrocyclone is collected in the storage tank 5.

In the present invention, specific examples are used to illustrate the principles and implementation of the present invention. The descriptions of the above examples are only used to help understand the method and core ideas of the present invention; at the same time, for those skilled in the art, according to the idea of the present invention, there will be changes in the specific implementation and application scope. In summary, the content of this specification should not be construed as limiting the present invention.

What is claimed is:

1. An external loop slurry reactor, comprising a gas-liquid integrated distributor, a riser, a degassing zone, at least one solid-liquid separation circulation unit, and a storage tank, wherein: the gas-liquid integrated distributor is provided under the degassing zone; two ends of the riser are connected to the gas-liquid integrated distributor and the degassing zone, respectively; a diameter of the degassing zone is larger than that of the riser; each of the at least one solid-liquid separation circulation unit comprises a downcomer, a first-stage hydrocyclone, and a multi-stage hydrocyclone; a lower end of the downcomer of one solid-liquid separation circulation unit of the at least one solid-liquid separation circulation unit is connected to an inlet of the first-stage hydrocyclone, and an upper end of the downcomer of the one solid-liquid separation circulation unit is connected to the degassing zone when the at least one solid-liquid separation circulation unit comprises the one solid-liquid separation circulation unit; when the at least one solid-liquid separation circulation unit comprises two or more solid-liquid separation circulation units, the two or more solid-liquid separation circulation units are provided in an axial direction of the riser in sequence, and the one solid-liquid separation circulation unit is at a top, and the upper end of the downcomer of the one solid-liquid separation circulation unit is connected to the degassing zone while an upper end of the downcomer of each of remaining ones of the two or more solid-liquid separation circulation units is connected to the riser; a first overflow port at a top of the first-stage hydrocyclone is connected to an inlet of the multi-stage hydrocyclone; a second overflow port at a top of the multi-stage hydrocyclone is connected to the storage tank; a first underflow ports at a bottom of the first-stage hydrocyclone and a second underflow port at a bottom of the multi-stage hydrocyclone are both connected to the riser, and a diameter of the first-stage hydrocyclone is larger than that of the multi-stage hydrocyclone.

2. The external loop slurry reactor according to claim 1, wherein the riser and the downcomer of each of the at least one solid-liquid separation circulation unit are each provided with a heat exchangers.

3. The external loop slurry reactor according to claim 1, wherein: a circulating pump is provided between the multi-stage hydrocyclone of each of the at least one solid-liquid separation circulation unit and the storage tank.

4. The external loop slurry reactor according to claim 1, wherein: the downcomer of each of the at least one solid-liquid separation circulation unit comprises an inclined section and a vertical section which are connected; the vertical section is connected to the inlet of the first-stage hydrocyclone; the inclined section is connected to the degassing zone or the riser, and the inclined section is provided obliquely downward from the degassing zone or the riser toward the vertical section.

5. The external loop slurry reactor according to claim 4, wherein: the first-stage hydrocyclone and the multi-stage hydrocyclone are connected to the riser through two connecting pipelines, respectively; the two connecting pipelines are provided obliquely downward from the first-stage hydrocyclone or the multi-stage hydrocyclone toward the riser.

6. The external loop slurry reactor according to claim 1, wherein: the degassing zone comprises a circular truncated cone section and a cylindrical section which are connected; a small-diameter end of the circular truncated cone section is connected to the riser, and a large-diameter end of the circular truncated cone section is connected to the cylindrical section.

7. The external loop slurry reactor according to claim 1, wherein: the multi-stage hydrocyclone comprises a plurality of hydrocyclone groups; the plurality of hydrocyclone groups are connected in series and diameters of the plurality of hydrocyclone groups gradually decreases, and each of the plurality of hydrocyclone groups comprises a plurality of hydrocyclones with a same diameter connected in parallel.

8. The external loop slurry reactor according to claim 2, wherein: the multi-stage hydrocyclone comprises a plurality of hydrocyclone groups; the plurality of hydrocyclone groups are connected in series and diameters of the plurality of hydrocyclone groups are gradually reduced, and each of the plurality of hydrocyclone groups comprises a plurality of hydrocyclones with a same diameter connected in parallel.

9. The external circulation slurry bed reactor according to claim 3, wherein: the multi-stage hydrocyclone comprises a plurality of hydrocyclone groups; the plurality of hydrocyclone groups are connected in series and diameters of the plurality of hydrocyclone groups are gradually reduced, and each of the plurality of hydrocyclone groups comprises a plurality of hydrocyclones with a same diameter connected in parallel.

10. The external circulation slurry bed reactor according to claim 4, wherein: the multi-stage hydrocyclone comprises a plurality of hydrocyclone groups; the plurality of hydrocyclone groups are connected in series and diameters of the plurality of hydrocyclone groups are gradually reduced, and each of the plurality of hydrocyclone groups comprises a plurality of hydrocyclones with a same diameter connected in parallel.

11. The external circulation slurry bed reactor according to claim 5, wherein: the multi-stage hydrocyclone comprises a plurality of hydrocyclone groups; the plurality of hydrocyclone groups are connected in series and diameters of the plurality of hydrocyclone groups are gradually reduced, and each of the plurality of hydrocyclone groups comprises a plurality of hydrocyclones with a same diameter connected in parallel.

12. The external circulation slurry bed reactor according to claim 6, wherein: the multi-stage hydrocyclone comprises a plurality of hydrocyclone groups; the plurality of hydrocyclone groups are connected in series and diameters of the plurality of hydrocyclone groups are gradually reduced, and each of the plurality of hydrocyclone group comprises a plurality of hydrocyclones with a same diameter connected in parallel.

* * * * *